June 2, 1970   F. J. BELCOURT ET AL   3,515,995
RADIATION HARDENED CLOCK PULSE DISTRIBUTOR
Filed Sept. 11, 1967   3 Sheets-Sheet 1

INVENTORS
FRANCIS J. BELCOURT
KARL T. KULP
BY Thomas J. Nikolai
ATTORNEY

United States Patent Office
3,515,995
Patented June 2, 1970

3,515,995
RADIATION HARDENED CLOCK PULSE DISTRIBUTOR
Francis J. Belcourt, Shakopee, and Karl T. Kulp, Minneapolis, Minn., assignors to Sperry Rand Corporation, New York, N.Y., a corporation of Delaware
Filed Sept. 11, 1967, Ser. No. 666,872
Int. Cl. H03b 27/00
U.S. Cl. 328—103     5 Claims

ABSTRACT OF THE DISCLOSURE

A generator of and a distribution system for a megahertz (mHz.) frequency clocking signal of picosecond (ps.) to nanosecond (ns.) pulse duration usable in ($10^9$ rads) gamma and/or ($10^{12}$ nvt) neutron radiation level environments.

BACKGROUND OF THE INVENTION

In recent years a considerable amount of time and effort has been expended upon the investigation of the effects of nuclear weapon burst and simulated weapon burst radiation on electronic components and semiconductor devices. Such work is principally concerned with the effects due to gamma ray and neutron ray bombardment of a transient radiation environment. Two reports— REIC Report No. 18, June 1, 1961 and REIC Report No. 26, Apr. 19, 1963, "Radiation Effects Information Center," Battelle Memorial Institute, Columbus 1, Ohio— cover this phase of the effects of nuclear radiation with a listing of probable component degradations. As pointed out in these above referenced reports, transient radiation effects on electronic components and semiconductor devices range from moderate to destructive with magnetic devices being the least susceptible to degraded performance. Prolonged radiation such as in the immediate proximity of an active reactor affects magnetic properties much the same as prolonged heating. Those materials that owe their distinctive properties to special heat treatments are most rapidly and permanently affected by high energy radiation. Material such as ferrites that have low Curie temperatures are impaired magnetically if their temperature rises excessively, either due to proximity to a heat source, or to internal conversion of radiant energy into heat. Otherwise, ferrites are notably immune to radiation damage, to either temporary or long term exposure.

With a magnetic device established as a radiation hardened device (i.e., a device whose operating characteristics are substantially unaffected by intense gamma ray and neutron ray bombardment) there has recently been proposed several systems for recording a transient phenomenon by sampling, at discrete levels, an electrical signal that is representative of such phenomenon. These systems provide a portable recorder that is lightweight, that requires no external power, and that may be placed in a transient radiation environment along with the device that is to be tested, while the information stored therein is not susceptible to nuclear radiation deterioration. These portable recorders provide a highly reliable, recoverable record of the measured, or detected phenomenon i.e., the effect upon the tested device, as a result of exposure to such environment. Such a system is disclosed in the copending patent application of C. W. Lundberg et al., now Pat. No. 3,432,818.

It is highly desirable that such portable radiation hardened recording systems include a compact, relatively inexpensive, radiation hardened clock pulse generator and distribution system whereby the sampling of the transient phenomenon, in the form of a transient electrical signal, may be accurately controlled during its recording operation. Accordingly, the present invention provides a generator of and a distribution system for a megahertz frequency clocking signal of a picosecond to a nanosecond pulse duration operable in gamma and neutron radiation environments.

SUMMARY OF THE INVENTION

The present invention relates to a generator of and a distribution system for a high frequency clocking signal of short pulse duration operable in low to intermediate intensity radiation environments. The distribution system of the present invention is driven by a clocking source that couples a series of high frequency, short duration clocking pulses to a plurality of parallel arranged blocking oscillators. Each clocking pulse is delayed an associated longer delay time with respect to the associated parallel arranged blocking oscillator whereby each of the blocking oscillators emits an associated, different time delayed output pulse for each clocking source pulse. Thus, with a clocking source signal of frequency F coupled to B blocking oscillators the parallel arranged blocking oscillators would emit B pulses per clocking pulse; the B pulses equally spaced over the pulse period of the clocking signal, i.e. the frequency of the B pulse signal output is BF.

The blocking oscillator output signals, a series of pulses of a frequency B times the frequency F of the clocking pulse source are, in turn, parallel coupled to N sample pulse generators. Each sample pulse generator has a built-in time delay different than each other such that the N sample pulse generators emit N equally spaced sample pulses for each B blocking oscillator pulse. Thus, the N sample pulse generators emit N sample pulses at a frequency of NBF. Further, the N sample pulse generators have their output signals, or sample pulses, common coupled to S strobe pulse output terminals. Intermediate the S strobe pulse output terminals and the N common coupled sample pulse generator outputs are $S-1$ time delays, further subdividing the driving pulse period, i.e., the pulse period of the sample pulse generator output signals, into S equally spaced strobe pulses.

As an example, in the illustrated embodiment the clocking signal source operates at a frequency F of 3.33 mHz.; the 3 common coupled blocking oscillators provide a resulting output signal of a frequency $$BF = 3 \times 3.33 \text{ mHz.} = 10 \text{ mHz.};$$

the N common coupled output sample pulse generators provide a resulting output signal of a frequency $$NBF = 10 \times 3 \times 3.33 \text{ mHz.} = 100 \text{ mHz.};$$

and, the S equally spaced strobe pulses, which are the ultimate output pulses generated by the distribution system, provide a resulting output signal of a frequency $SNBF = 5 \times 10 \times 3 \times 3.33$ mHz. $= 500$ mHz. With the pulse forming network of the distribution system providing an output pulse of 2 nanoseconds (ns.) in duration there is provided by the illustrated embodiment of the present invention a two nanosecond duration pulse having a frequency of 500 mHz. Accordingly, there is provided by the present invention a generator of and a distribution system for a high frequency strobe pulse signal operable in gamma and/or neutron radiation environments.

DESCRIPTION OF THE PREFERRED EMBODIMENT

Figure 1:
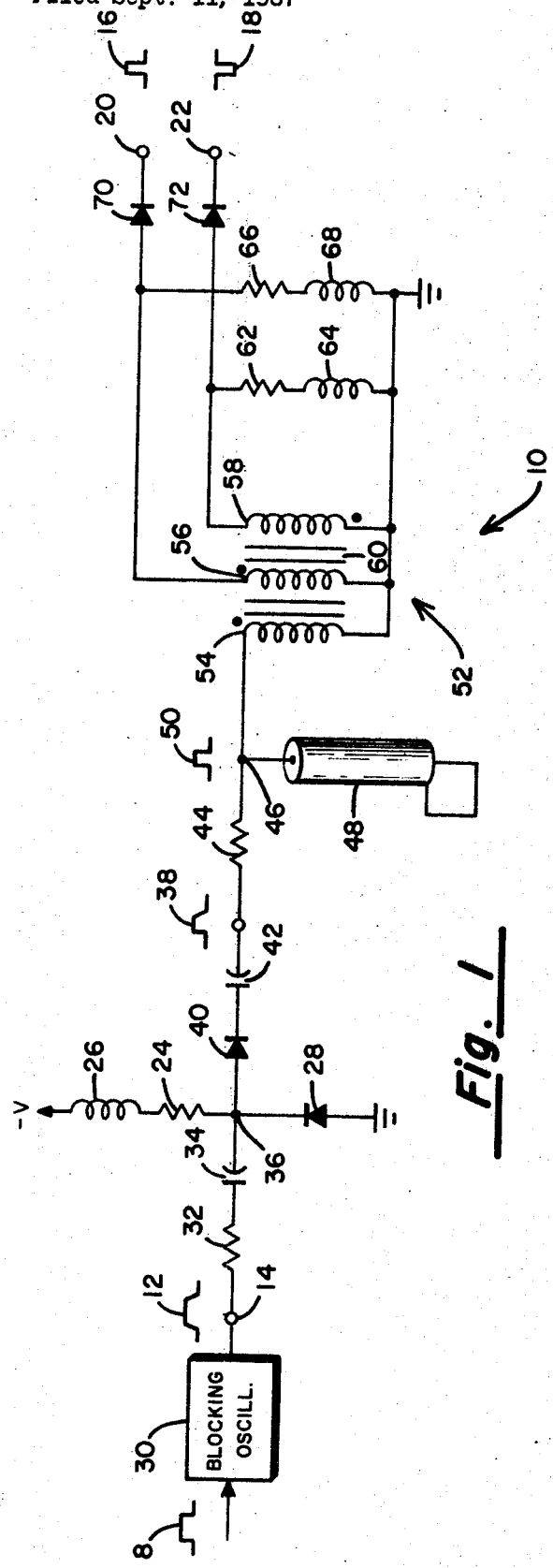
FIG. 1 is a circuit schematic of the sample pulse generator of the present invention.

With particular reference to FIG. 1 there is presented a circuit schematic of the sample pulse generator 10 of the present invention. Generator 10, when a signal 12 is coupled to its input terminal 14, produces at its output terminals 20, 22 output signals 16, 18 of substantially similar waveform characteristics but of opposite polarities. Signal 16, and its complement 18, of a duration $t_2$ (see FIG. 2) are delayed with respect to the input signal 12 a predeterminably, but variably, delayed time $t_1$. Delay time $t_1$ is a function of the magnitude of resistor 24 that through inductor 26 and voltage source —V determines the storage phase duration $t_1$ of step recovery diode 28. Generator 10, in its static condition, i.e., with no signal 12 applied to its input terminal 14, has step recovery diode 28 forward biased in its conducting mode through the biasing arrangement of resistor 24, inductor 26 and voltage source —V.

Figure 2:
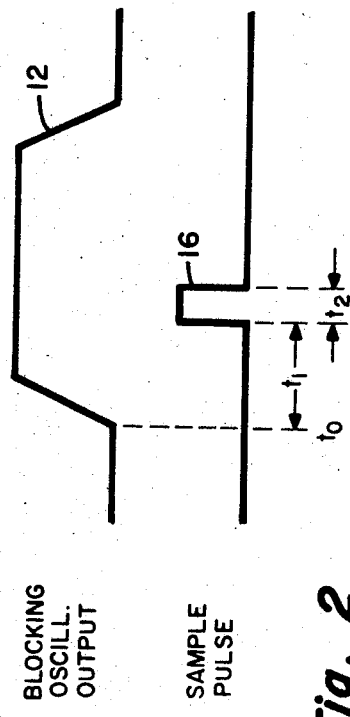
FIG. 2 is an illustration of the signal timing relationships associated with the sample pulse generator of FIG. 1.

With particular reference to FIG. 2 there is presented an illustration of the signal timing relationships associated with sample pulse generator 10 of FIG. 1. If at time $t_0$ blocking oscillator 30 couples pulse 12 to input terminal 14, pulse 12 passes through serially arranged load matching resistor 32 and AC coupling capacitor 34 to node 36. Pulse 12, at node 36, proceeds to reverse bias step recovery diode 28, cutting off the current passing therethrough while the voltage thereacross remains at a relatively low level. The time $t_1$, which is the time during which the voltage drop across step recovery diode 28 remains in its low level, is called the storage phase duration $t_1$ and is a function of the charge previously held by the step recovery diode 28 which was determined by the biasing arrangement of resistor 24, inductor 26 and voltage source —V. By varying the magnitude of resistor 24 the level of the current flowing through step recovery diode 28 during its forward bias time is varied accordingly. Consequently, with the amount of charge in step recovery diode 28 established by the current flowing therethrough, which current magnitude is determined by the magnitude of resistor 24, the storage phase duration $t_1$, and, accordingly, the amount of time required to deplete the previously established charge, is a function of the magnitude of resistor 24.

After the charge in the step recovery diode 28 is depleted, the voltage across diode 28 increases rapidly during its transition period and produces a pulse 38 having a rise time in the picosecond region. The fast front edge of pulse 38 from node 36 is coupled through serially arranged diode 40, AC coupling capacitor 42 and load matching impedance 44 to node 46. At node 46 pulse 38 is coupled to a shorted transmission line 48 that is cut to a length that limits the width of the resulting pulse 50 to a duration $t_2$ of two nanoseconds in duration. The leading edge of pulse 38 being coupled to the center conductor of shorted transmission line 48 is reflected back out of phase with the input pulse at a time difference of two nanoseconds whereby the remaining portion of pulse 38 after a time $t_2$ is cancelled leaving the narrow pulse 50 that is equal to twice the electrical length of the shorted transmission line 48.

Output transformer 52 having input winding 54 and output windings 56, 58 wound about core 60 couples pulse 50 at node 46 to output terminals 20 and 22 providing the corresponding output pulses 16 and 18 thereat. Serially arranged resistor 62, inductor 64 and resistor 66, inductor 68 are utilized to provide the proper terminating impedance to match the dynamic impedance of the following circuitry on the associated output lines while diodes 70 and 72 are utilized to provide the proper isolation of generator 10 when coupled in the distribution system of FIG. 3.

Figure 3:
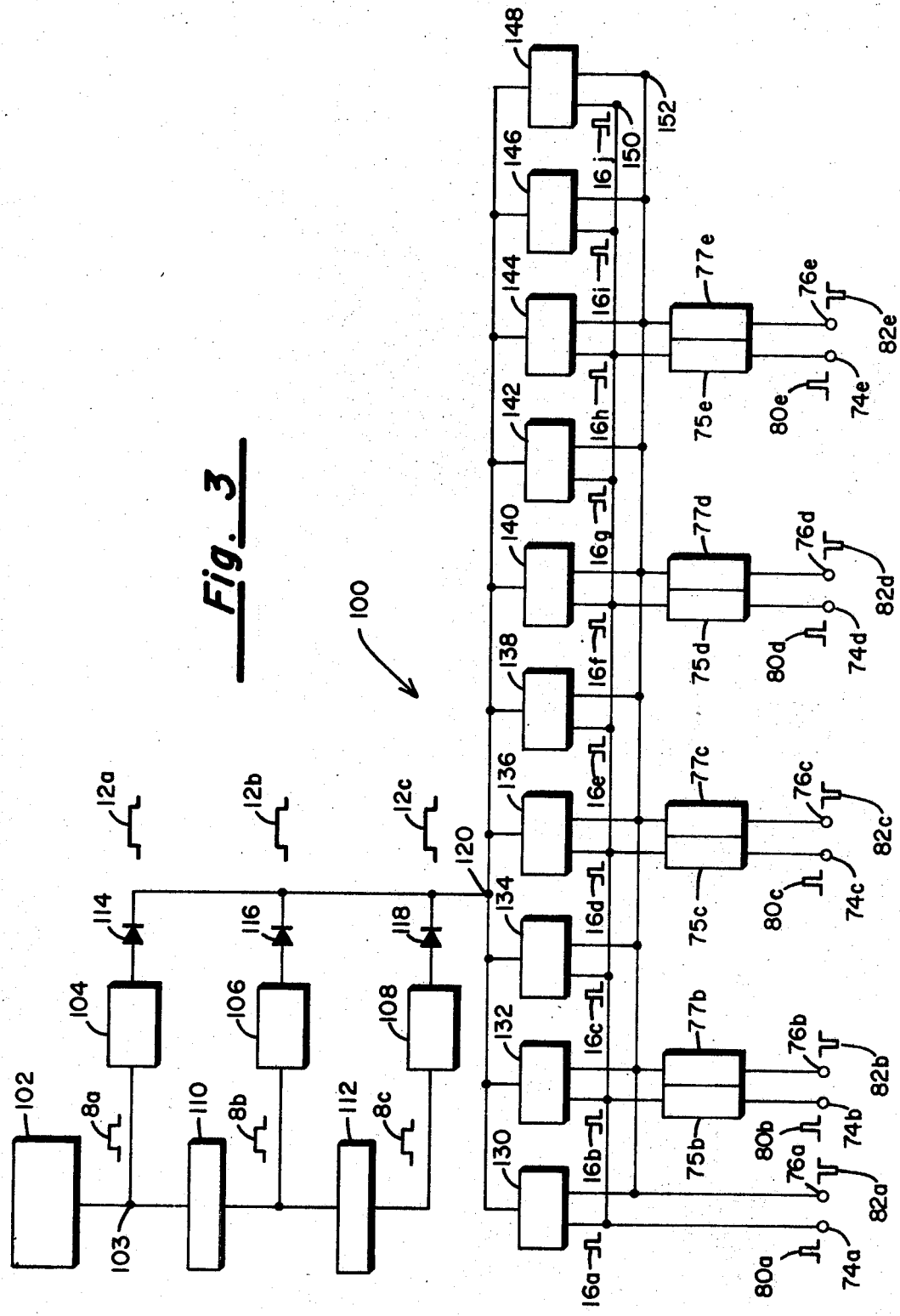
FIG. 3 is a block diagram of the pulse distribution system of the present invention.

With particular reference to FIG. 3 there is presented a block diagram of the pulse distribution system 100 of the present invention. System 100 basically consists of a master clocking signal source 102 that couples a series of high frequency, short duration clocking pulses 8a, 8b and 8c to a plurality of parallel arranged blocking oscillators 104, 106 and 108. Each clocking pulse 8a, 8b, 8c is delayed an associated longer delay time with respect to the associated parallel arranged blocking oscillator 104, 106, 108 by associated, serially aligned 100 nanosecond delay means 110, 112. Each of the blocking oscillators 104, 106, 108 through their associated isolation diodes 114, 116, 118 emits an associated, different time delayed output pulse 12a, 12b, 12c for each clocking source pulse 8. Thus, for each clocking source 102 pulse 8 there is provided at node 120 a signal of a frequency that is equal to the frequency of the clocking source 102 signal times the number of parallel coupled blocking oscillators associated therewith. Thus, with a clocking source 102 signal of frequency F coupled to B blocking oscillators the parallelly arranged blocking oscillators emit B pulses per clocking pulse; B pulses equally spaced over the pulse period of the clocking signal, i.e., the frequency of the B pulses at node 120 is BF.

Figures 4, 5:
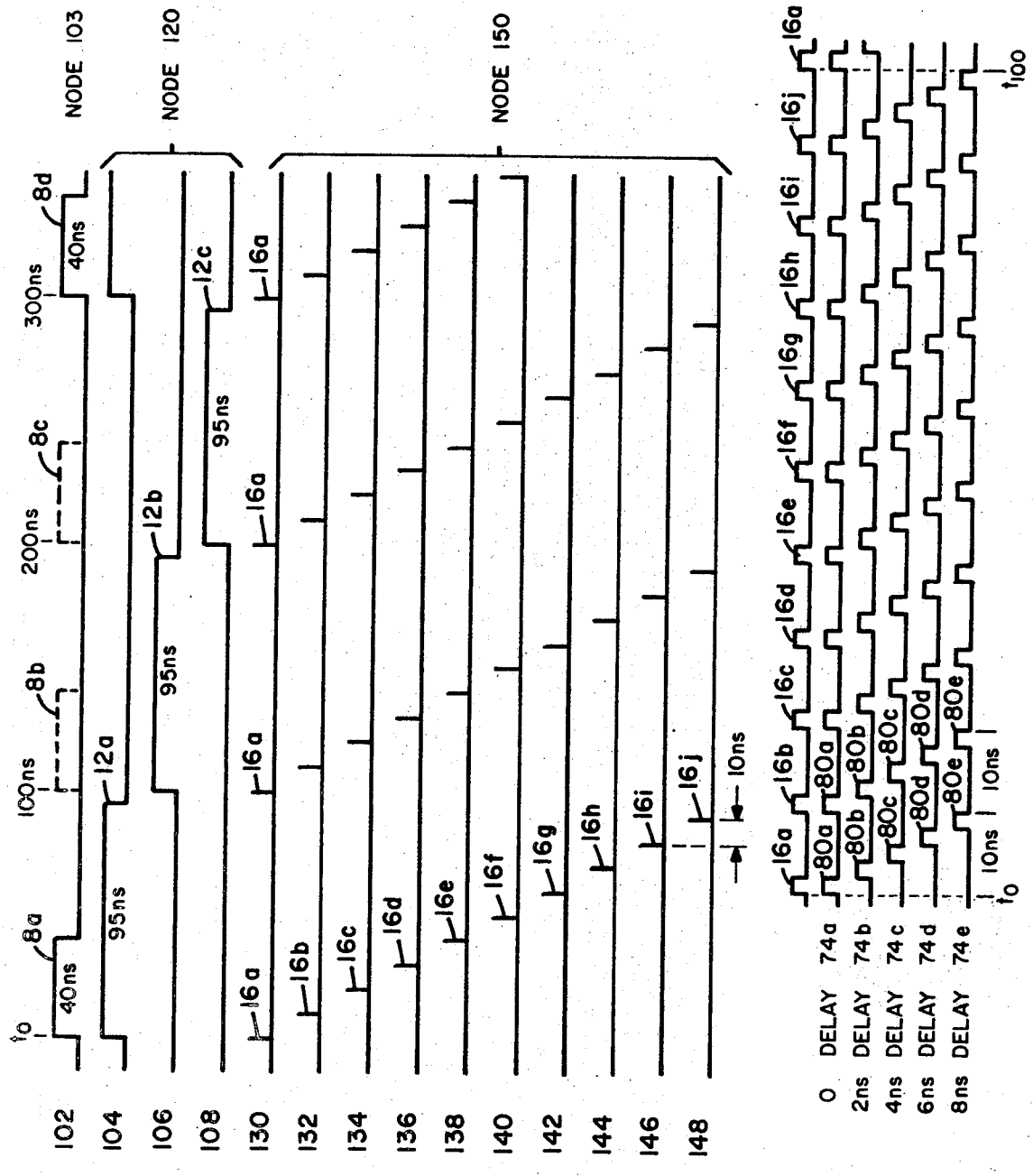
FIG. 4 is an illustration of the signal timing relationships associated with the sample pulse generators of the embodiment of FIG. 3.
FIG. 5 is an illustration of the signal timing relationships associated with the sample pulse generator output signals, and the strobe pulses, which are the ultimate output signals of the distribution system, of FIG. 3.

With particular reference to FIG. 4 there is presented an illustration of the signal timing relationships associated with signal pulse generator 10 of the embodiment of FIG. 1 incorporated in distribution system 100 of FIG. 3. With clocking pulse source 102, at time $t_0$, coupling pulse 8a of a duration of 40 nanoseconds and a frequency of 3.3 megahertz (mHz.) to node 103 there are provided at the inputs of blocking oscillators 104, 106, 108 pulses 8a, 8b, 8c (pulses 8b, 8c providing an increasing delay time of 100 nanoseconds by delay means 110, 112). Blocking oscillators 104, 106, 108 couple to node 120 associated pulses 12a, 12b, 12c, each of 95 nanoseconds in duration and of a resulting frequency of 10 megahertz.

The blocking oscillator 104, 106, 108 output signals 12a, 12b, 12c, a series of pulses of a frequency B times the frequency of the clocking pulse source 102, are, in turn, parallel coupled to N sample pulse generators 130–148. Each of the sample pulse generators 130–148 is similar to pulse generator 10 of FIG. 1 with the resistors 24 of each of the sample pulse generators 130–148 being adjusted to provide an associated different delay time $t_1$ providing an output signal 16 of a duration $t_2$ whereby there are provided at their common output node 150 a series of equally spaced sample pulses 16 equally divided over the frequency of the signal coupled to node 120. As each of the N sample pulse generators 130–148 has a built-in time delay different than that of each other, the N sample pulse generators 130–148 emit N equally spaced sample pulses for each B blocking oscillator pulse. Thus, the N sample pulse generators 130–148 emit N sample pulses at a frequency of NBF. With there being ten sample pulse generators 130–148 utilized in the illustrated embodiment of FIG. 3 it is apparent that there is provided at their common output node 150 a series of pulses 16a–16j of a frequency of 100 megahertz. Correspondingly, it is apparent that sample pulse generators 130–148 couple at their common output node 152 a like series of pulses 18 having a time and frequency similar to that of the series of pulses 16 but of an opposite polarity thereto. With reference back to FIG. 4 there is presented the signal timing relationships of sample pulses 16a–16j. FIG. 4 illustrates the relationship whereby there is provided at node 150 a series of pulses 16a–16j for each of the pulses 12a, 12b, 12c at node 120.

The N sample pulse generators 130–148 couple their outputs, or sample pulses 16a–16j at common node 150 to a group of parallel coupled output terminals 74a, 74b, 74c, 74d and 74e. In like manner, common node 152 of sample pulse generators 130–148 is coupled to the parallel arranged output terminals 76a, 76b, 76c, 76d and 76e. Intermediate common output node 150 and output terminals 74b, 74c, 74d and 74e there are provided respectively associated delay means 75b, 75c, 75d and 75e. Signal delay means 75b delays the signal passing therethrough a period of two nanoseconds while delay means 75c, 75d and 75e provide delays of increasing increments of two nanoseconds for delays of four nanoseconds, six nanoseconds and eight nanoseconds, respectively.

Correspondingly, it is apparent that delay means 77b, 77c, 77d and 77e provide correspondingly delayed output signals from their common node 152 to their respectively associated output terminals 76b, 76c, 76d and 76e. Accordingly, with the N sample pulse generators 130–148 coupling their output signals at common output node 150 to S sample pulse output terminals (intermediate the S sample pulse output terminals and the common node 150 are $S-1$ delay means subdividing the frequency of the signals coupled thereto) there are provided at output terminals 74a, 74b, 74c, 74d and 74e S equally spaced strobe pulses 80a, 80b, 80c, 80d and 80e providing an output signal therefrom having a frequency of 500 megahertz—see FIG. 5. Accordingly, with the pulse forming network of distribution system 100 of FIG. 3 providing output pulses of two nanoseconds in duration there are provided from the output terminals 74a, 74b, 74c, 74d and 74e the corresponding output signals 80a, 80b, 80c, 80d and 80e each of two nanoseconds in duration providing a corresponding output frequency of 500 megahertz.

In order to facilitate an understanding of the operation of the present invention the following group of actual values for the elements of sample pulse generator 10 of FIG. 1 are presented. It should be understood that the principles of operation of this circuit may be present in circuits having a wide range of individual specifications so that the list of values here presented should not be construed as a limitation thereto.

| | |
|---|---|
| V | −10 volts. |
| Resistors: | |
| 32 | 1K ohms±10% carbon. |
| 24 | Variable ±10% carbon. |
| 44 | 100 ohms±10% carbon. |
| 62 | 10K ohms±10% carbon. |
| 66 | 10K ohms±10% carbon. |
| Capacitors: | |
| 34 | 0.05 mµfd.±10% ceramic. |
| 42 | 0.05 mµfd.±10% ceramic. |
| Diodes: | |
| 28 | HPA–0183 Hewlett Packard. |
| 40 | HPA–5353 Hewlett Packard. |
| 70 | HPA–5353 Hewlett Packard. |
| 72 | HPA–5353 Hewlett Packard. |
| Inductors: | |
| 26 | 10 microhenry (mh.) choke. |
| 64 | 10 mh. choke. |
| 68 | 10 mh. choke. |
| Delay 48 | RG–58A/U coax. |
| Transformer 52: | |
| Core 60 | CF101–Q3 Indiana General. |
| Windings 54, 56, 58 | 10 turns each; turns ratio 1/1/1. |

As the elements of FIG. 3, except for the sample pulse generators 130–148 may be of many well-known constructions, no detailed discussion shall be given thereof. As an example, delay means 75, 77, 110 and 112 may be of the well-known strip line or lumped constant configuration while diodes 114, 116 and 118 may be similar to diode 40 of sample pulse generator 10 of FIG. 1. Further, blocking oscillators 104, 106 and 108 may be of many well-known configurations including that disclosed in the copending patent application G. L. Grundy, Ser. No. 549,431, filed May 9, 1966, and now abandoned.

Thus, it is apparent that there has been described and illustrated herein the preferred embodiment of the present invention that provides a novel radiation hardened pulse generator and distributor system therefor. Having, now, fully illustrated and described our invention, what we claim to be new and desire to protect by Letters Patent is set forth in the appended claims.

What is claimed is:

1. A distribution system for a high frequency clocking signal for use in a nuclear radiation environment, comprising:
   a clocking signal generator of a clocking signal of a frequency F;
   B oscillators driven at a first common coupled end by said clocking signal generator for providing at a common coupled first node an oscillator signal of a frequency BF;
   N sample pulse generators common coupled to said first node for providing at a common coupled second node a sample pulse signal of a frequency NBF; and
   S strobe pulse output means common coupled to said second node for providing at their S output terminals strobe pulses of a frequency SNBF.

2. The distribution system of claim 1 further including delay means for coupling each clocking signal pulse to said oscillators at successively increased delay periods for causing each of said oscillators to couple an associated delayed oscillator pulse to said first node.

3. The distribution system of claim 2 wherein each of said N sample pulse generators includes means for delaying each of said oscillator pulses a different associated delay period for causing said N sample pulse generators to couple N equally spaced sample pulses to said second node upon the coupling of each oscillator pulse to said first node.

4. The distribution system of claim 3 wherein said S strobe pulse output means include $S-1$ delay means, each of said $S-1$ delay means associated with an associated one of said strobe pulse output means.

5. The distribution system of claim 4 wherein said S strobe pulse output means further provide complemented S equally spaced strobe pulses at S complement output terminals.

References Cited

UNITED STATES PATENTS

| 2,686,264 | 8/1954 | Gray | 328—62 |
| 3,054,960 | 9/1962 | Pearlman | 328—106 |
| 3,104,330 | 9/1963 | Hamilton | 328—105 |

DONALD D. FORRER, Primary Examiner

D. M. CARTER, Assistant Examiner

U.S. Cl. X.R.

307—260; 331—56